United States Patent
Epple et al.

(10) Patent No.: US 6,849,693 B2
(45) Date of Patent: Feb. 1, 2005

(54) HYDROXYL GROUP-CONTAINING POLYMERS, THEIR PREPARATION AND USE

(75) Inventors: Ulrich Epple, Artlenburg (DE); Martin Geisberger, Graz (AT); Fritz Gartler, Wundschuh (AT)

(73) Assignee: Solutia Austria GmbH (AT)

( * ) Notice: Subject to any disclaimer, the term of this patent is extended or adjusted under 35 U.S.C. 154(b) by 22 days.

(21) Appl. No.: 10/317,705

(22) Filed: Dec. 12, 2002

(65) Prior Publication Data

US 2003/0130417 A1 Jul. 10, 2003

(30) Foreign Application Priority Data

Dec. 13, 2001 (AT) ................................. A 1956/2001

(51) Int. Cl.⁷ ............................................. C08L 67/00
(52) U.S. Cl. .................... 525/176; 525/10; 525/131; 525/162; 525/166; 525/167; 525/170; 525/440; 525/443; 525/444; 525/445
(58) Field of Search ................... 525/10, 176, 445, 525/166, 167, 170, 131, 162, 440, 443, 444

(56) References Cited

U.S. PATENT DOCUMENTS

| | | | | |
|---|---|---|---|---|
| 6,048,936 A | | 4/2000 | Epple et al. ................ | 525/124 |
| 6,087,469 A | * | 7/2000 | Epple et al. ................ | 528/307 |
| 6,596,817 B2 | * | 7/2003 | Epple et al. ................ | 525/419 |

FOREIGN PATENT DOCUMENTS

| | | | | |
|---|---|---|---|---|
| DE | 42 09 035 A1 | 9/1993 | ......... | C08F/283/01 |
| DE | 100 33 512.8 A1 | 2/1994 | ........... | C08G/63/20 |
| DE | 195 44 737 C1 | 12/1996 | ......... | C08F/283/02 |
| EP | 0 104 683 A1 | 4/1984 | ............ | H01B/3/30 |
| EP | 0 680 977 A1 | 11/1995 | ......... | C08F/220/32 |
| EP | 0 854 157 A1 | 7/1998 | ......... | C08F/290/06 |
| EP | 0 885 907 A1 | 12/1998 | ........... | C08G/18/40 |
| EP | 0 896 991 A1 | 2/1999 | ......... | C09D/151/08 |
| EP | 0 940 415 A2 | 9/1999 | ........... | C08G/18/42 |
| EP | 0 896 991 | 4/2000 | | |
| EP | 1 172 394 A2 | 1/2002 | ......... | C08G/63/685 |

* cited by examiner

Primary Examiner—Jeffrey B. Robertson
(74) Attorney, Agent, or Firm—Connolly Bove Lodge & Hutz LLP

(57) ABSTRACT

Hydroxyl group-containing polymers which comprise moieties of polyesters and of addition polymers formed from olefinically unsaturated monomers, the polyesters containing units from aliphatic cyclic or polycyclic dihydroxy or polyhydroxy compounds or diepoxy or polyepoxy compounds A and aliphatic cyclic dicarboxylic or polycarboxylic acids B and the addition polymers containing units from olefinically unsaturated alkyl esters G of aliphatic, linear, branched or cyclic olefinically unsaturated monocarboxylic and/or dicarboxylic acids, olefinically unsaturated hydroxyalkyl esters H of one of the acids specified under G, at least one further olefinically unsaturated monomer I selected from vinylaromatics, vinyl esters, halogenated monomers, unsaturated nitriles, amides or diamides of unsaturated monocarboxylic acids, vinyl ethers, and allyl ethers, and also, where appropriate, carboxylic acids J, selected from the monocarboxylic acids specified under G or dicarboxylic acids specified under G in unesterified or monoesterified form, processes for preparing them, and their use as coating compositions.

22 Claims, No Drawings

HYDROXYL GROUP-CONTAINING POLYMERS, THEIR PREPARATION AND USE

FIELD OF THE INVENTION

The invention relates to hydroxyl group-containing polymers, to their preparation, and to their use in particular in industrial coating compositions, i.e., high solids coating materials having very good application properties.

BACKGROUND OF THE INVENTION

Modern-day sprayable clearcoat materials and pigmented topcoat materials, as well as surfacer materials, are low in solvent, i.e., they contain fewer volatile organic compounds (VOCs) which are emitted into the atmosphere in the course of their application and drying. These environmentally compatible coating compositions include low molar mass binders and curing agents. In the case of a two-component (two-pack) coating composition, curing agents are used which already react at low temperatures with the functional groups of the binder, to form a crosslinked film (normally, polyfunctional isocyanates are used); in the case of one-component (one-pack) coating compositions, curing agents are used which-react only at an elevated temperature (normally melamine resins).

Binders of this kind are frequently low molar mass, hydroxy-functional polyesters or polyacrylates. Nowadays use is already being made additionally of acrylic-modified polyesters or of polyester-modified acrylic resins or of mixtures of these resins with one another or of resins of this kind to which reactive diluents have been added (EP 0 680 977, EP 0 896 991, EP 0 940 415, DE 100 33 512.8). Reactive diluents are organic chemicals which lower the viscosity of the coating composition and react with the curatives.

With all of these attempts at a solution there have to date been disadvantages in terms of application reliability, particularly in the industrial use of pigmented topcoat materials and in the drying of such systems.

Pigmented industrial topcoat materials are presently applied by "air mix" or frequently by "airless" techniques in a high film thickness (at least 120 µm). It is here that the existing binders of low molar mass display significant disadvantages in terms of deaeration and drying rate. One object is therefore to provide binders free of the said disadvantages. In addition, such systems are nowadays required to have paint solids contents (mass fraction of solids) of at least 80% (with an efflux time of 90 s from a 4 mm-cup at 23° C.).

Surprisingly it has been found that the requirements in terms of paint solids content, reliability in air mix and airless application, satisfactory deaeration, and drying rate can be met by polymerizing olefinic monomers (e.g., acrylic monomers and/or styrene monomers) in the presence of specific, low molar mass, "hard", hydroxyl-containing polyesters, the components being used preferably in amounts such that in the resulting hydroxyl group-containing polymer, there are mass fractions of from 30 to 70% of the polyester and from 70 to 30% of the addition polymer, with particular preference mass fractions of from 40 to 60% of polyester and from 60 to 40% of the addition polymer.

The invention accordingly provides hydroxyl group-containing polymers which comprise moieties of polyesters (i.e. which are free from olefinic unsaturations) and moieties of addition polymers formed from olefinically unsaturated monomers, the polyesters containing units of saturated aliphatic cyclic or polycyclic dihydroxy or polyhydroxy compounds or diepoxy or polyepoxy compounds A, saturated aliphatic cyclic dicarboxylic or polycarboxylic acids B, and, where appropriate, further units derived from branched saturated aliphatic acyclic dihydroxy or polyhydroxy compounds C, from aliphatic saturated linear acyclic dihydroxy or polyhydroxy compounds D which contain at least two hydroxyl groups per molecule, from polyfunctional compounds E, the compounds E being selected from aliphatic saturated linear and branched dicarboxylic acids E1 and from aromatic dicarboxylic and polycarboxylic acids E2 containing at least two carboxyl groups per molecule, and from monofunctional compounds F, the compounds F being selected from monocarboxylic acids, monoalcohols, and monoepoxides, all free from olefinic unsaturation, and the addition polymers containing units of olefinically unsaturated alkyl esters G of aliphatic, linear, branched or cyclic olefinically unsaturated monocarboxylic and/or dicarboxylic acids, especially α, β-unsaturated monocarboxylic acids having from 3 to 10 carbon atoms, preferably from 4 to 7 carbon atoms, it being possible for the alkyl radical to be linear, branched or cyclic and said alkyl radical having preferably from 1 to 20, with particular preference up to 15, and in particular from 2 to 12 carbon atoms, olefinically unsaturated hydroxyalkyl esters H of one of the acids specified under G, the hydroxyalkyl radical being derived from an at least dihydric aliphatic linear, branched or cyclic alcohol having preferably from 2 to 15, with particular preference from 2 to 8, carbon atoms, at least one further olefinically unsaturated monomer I selected from the group consisting of vinylaromatics such as styrene, α-methylstyrene, vinyltoluene, vinyl esters of aliphatic linear, branched or cyclic monocarboxylic acids having in particular from 2 to 20, with particular preference from 3 to 12, carbon atoms, halogenated monomers, such as chlorostyrene, vinyl chloride, vinylidene chloride, unsaturated nitriles such as acrylonitrile and methacrylonitrile, amides or diamides of unsaturated monocarboxylic acids, vinyl ethers and allyl ethers of aliphatic linear, branched or cyclic alcohols having preferably from 1 to 18 carbon atoms, esters of glycidyl alcohol or methylglycidyl alcohol with olefinically unsaturated carboxylic acids, and olefinically unsaturated ketones having in particular from 4 to 21 carbon atoms, and also, where appropriate, carboxylic acids J, selected from the monocarboxylic acids specified under G or from the dicarboxylic acids specified under G in unesterified form or preferably in the form in which they are monoesterified with one of the alkyl radicals specified under G or with one of the hydroxyalkyl radicals specified under H.

DETAILED DESCRIPTION OF THE PREFERRED EMBODIMENTS

The hydroxyl group-containing polymers preferably have a hydroxyl number of from 40 to 250 mg/g, with particular preference from 70 to 200 mg/g, and in particular from 80 to 180 mg/g. Their acid number is preferably from 0 to 30 mg/g, with particular preference from 0.5 to 20 mg/g, and in particular from 1 to 15 mg/g. Their solution viscosity, measured on a 50% strength solution in butyl acetate (50 g of polymer in 100 g of the solution) at 23° C. in accordance with DIN EN ISO 3219, is preferably from 5 to 40 mPa·s, with particular preference from 10 to 35 mPa·s, and in particular from 15 to 32 mPa·s. Their average molar mass (weight average $M_w$, measured by gel permeation chromatography, calibrating with polystyrene standards) is preferably not more than 3500 g/mol, with particular preference from 1500 to 3300 g/mol, and in particular from 1700 to 3200 g/mol. The polydispersity $M_w/M_n$, $M_n$ being the number-average molar mass determined in the same way, is preferably not more than 3.5, with particular preference not more than 3.0.

The acid number is defined in accordance with DIN EN ISO 3682 as the ratio of that mass $m_{KOH}$ of potassium hydroxide required to neutralize a sample under analysis to the mass $m_B$ of this sample (mass of the solid in the sample in the case of solutions or dispersions); its customary unit is "mg/g". The hydroxyl number is defined in accordance with DIN EN ISO 4629 as the ratio of that mass $m_{KOH}$ of potassium hydroxide which has exactly the same number of hydroxyl groups as a sample under analysis to the mass $m_B$ of this sample (mass of the solid in the sample in the case of solutions or dispersions); its customary unit is "mg/g".

The polyesters preferably have a weight-average molar mass $M_w$ of up to 1750 g/mol, in particular up to 1500 g/mol, and especially up to 1400 g/mol (gel permeation chromatography, calibrating with polystyrene standards). They possess (calculated) hydroxyl numbers of from 80 to 280 mg/g, preferably at least 150 mg/g, and acid numbers of from 5 to 40 mg/g, based in each case on resin solids. At room temperature (23° C.) they are preferably solid and do not stick.

Particularly suitable polyesters are condensation products of the following starting materials, the mass fractions of the units in the polyester that derive from these materials being stated in %=cg/g:

from 10 to 90%, in particular from 15 to 80%, from the compounds A, from 10 to 90%, in particular from 15 to 80%, from the compounds B, and preferably only one of the following up to 55%, in particular up to 40%, from the compounds C, up to 55% from aliphatic linear acyclic dihydroxy or polyhydroxy compounds D which contain at least two hydroxyl groups per molecule, up to 30% from polyfunctional compounds E, the compounds E being selected from aliphatic linear and branched dicarboxylic acids E1 and aromatic dicarboxylic and polycarboxylic acids E2 containing at least two carboxyl groups per molecule, and up to 35% from monofunctional compounds F, the compounds F being selected from monocarboxylic acids, monoalcohols, and monoepoxides.

They preferably contain not more than three aliphatic units from groups A, B and one of the other groups, in other words in each case from only one compound from these groups. Where the sum of the mass fractions of structural units derived from A, B and a third compound selected from C, D, E, and F is at least 90%, preferably at least 93%, and in particular at least 95%, it is also possible to make use for the invention of a polyester which includes structural units from a fourth group.

In this context it is also possible to use mixtures of two or more compounds from in each case one or more of classes A to F, although it is preferred to choose in each case only one compound from each group. Where two or more compounds from one group are used, one compound from that group ought to make up at least 80% of the mass of these compounds, preferably at least 90%, and in particular at least 95%. Where a mixture of this kind is used in one group, only one compound should preferably be selected from the other groups.

Furthermore, within the context of the invention it is possible and preferred to use mixtures of two or more such polyesters of different composition.

As compounds A use is made of saturated aliphatic cyclic or polycyclic dihydroxy or polyhydroxy compounds A1 or aliphatic cyclic or polycyclic diepoxy or polyepoxy compounds A2. The compounds A have from 5 to 30 carbon atoms. The dihydroxy and polyhydroxy compounds A1 are preferably selected from 1,2- and 1,3-dihydroxycyclopentane, 1,2-, 1,3-, and 1,4-dihydroxycyclohexane, 1,2-, 1,3-, and 1,4-bis (hydroxymethyl)cyclohexane, 2,6,6-trimethylbicyclo[3.1.1]heptane-2,3-diol, bicyclo[2.2.2]oct-5-ene-2,3-dimethanol, 1,4-bis(2-hydroxyethyl)piperazine, 4,8-bis(hydroxymethyl) tricyclo[5.2.1.0$^{2,6}$]decane, N,N'-dimethylol-2-imidazolidone, N,N'-dimethylol-4,5-dihydroxy-2-imidazolidone, the reaction products of parabanic acid or 2-imidazolidone (ethyleneurea) with oxirane or methyloxirane that have in each case two hydroxyl groups, and the reaction products of glycoluril (acetyleneurea) with formaldehyde, oxirane or methyloxirane to give the corresponding tetra-hydroxymethyl-, -hydroxyethyl- or -hydroxypropyl-glycolurils. Among the polyols containing heteroatoms, particular preference is given to tris(hydroxyethyl) isocyanurate or to trishydroxypropyl isocyanurate, the latter being obtainable by reaction with methyloxirane.

The compounds A2 are preferably prepared by reacting reactive epoxy-functional compounds with cyclic compounds containing active hydrogen atoms. For example, by reacting epichlorohydrin with isocyanuric acid, the preferred triglycidyl isocyanurate can be obtained; other epoxy-functional compounds may be prepared, for example, by reacting epichlorohydrin with the above-mentioned cyclic ureas, examples being diglycidylethyleneurea, diglycidylparabanic acid, and tetraglycidylacetyleneurea.

By reacting mixtures of epichlorohydrin and oxirane or methyloxirane it is also possible to prepare compounds A of mixed functionality containing hydroxyl and epoxy groups.

The saturated aliphatic cyclic dicarboxylic or polycarboxylic acids B and their anhydrides have from 6 to 20 carbon atoms and are preferably selected from the cyclic dicarboxylic acids 1,2- and 1,4-cyclohexanedicarboxylic acid, cis-5-norbornene-endo-2,3-dicarboxylic acid and 5-methylnorbornene-2,3-dicarboxylic acid (nadic acid) and 1,4,5,6,7,7-hexachloro-5-norbornene-2,3-dicarboxylic acid (chlorendic acid) and the anhydrides thereof, and also the tricarboxylic acid 1,3,5-cyclohexanetricarboxylic acid and its anhydride.

The branched saturated aliphatic acyclic dihydroxy or polyhydroxy compounds C have preferably from 2 to 20 carbon atoms, the dihydroxy compounds having with particular preference from 2 to 9 and the polyhydroxy compounds with particular preference from 3 to 12 carbon atoms. Among the dihydroxy compounds, 1,2-propanediol, neopentyl glycol, 2-methylpropane-1,3-diol, 2-methyl-2-butylpropane-1,3-diol, 2,2,4-trimethylpentane-1,5-diol and 2,2,4- and 2,4,4-trimethylhexane-1,6-diol are particularly preferred. Preferred branched trihydroxy and polyhydroxy compounds include trimethylolethane and trimethylolpropane, pentaerythritol, diglycerol, ditrimethylolpropane, ditrimethylolethane, and dipentaerythritol. It is likewise possible to use reaction products of these alcohols with oxirane and/or methyloxirane.

The saturated aliphatic linear acyclic dihydroxy or polyhydroxy compounds D which contain at least two hydroxyl groups per molecule have from two to 20 carbon atoms and are preferably selected from glycol, 1,3-propanediol, 1,4-butanediol, 1,6-hexanediol, glycerol, 1,2,6-trihydroxyhexane, 1,2,3-trihydroxyheptane, erythritol, sorbitol, xylitol, and mannitol. It is also possible to use oligomers of ethylene glycol such as diglycol, triglycol, and tetraethylene glycol.

The polyfunctional compounds E may be saturated aliphatic linear and branched dicarboxylic acids E1, aromatic dicarboxylic and polycarboxylic acids E2 containing at least two carboxyl groups per molecule, and aliphatic saturated polycarboxylic acids E3 containing at least 3 carboxyl groups and in each case from 2 to 40 carbon atoms. The dicarboxylic acids E1 are preferably oxalic acid, malonic acid, succinic acid, glutaric acid, adipic acid, pimelic acid, suberic acid, sebacic acid, dimethylsuccinic acid, butylmalonic acid, diethylmalonic acid, dimethylglutaric acid, methyladipic acid, and also the hydrogenated fatty acid dimers and mixtures thereof; and the aromatic dicarboxylic and polycarboxylic acids E2 are preferably phthalic acid, isophthalic acid, and terephthalic acid, 1,4-, 2,3-, and 2,6-naphthalenedicarboxylic acid, 4,4'-biphenyldicarboxylic acid, 4,4'-oxydiphenyldicarboxylic acid, 4,4'-sulfonyldiphenyldicarboxylic acid, 4,4'-benzophenonedicarboxylic acid, trimellitic acid, trimesic acid, pyromellitic acid, and benzophenonetetracarboxylic acid. Among the aliphatic polycarboxylic acids E3, tricarballylic acid, citric acid, 1,3,5-cyclohexanetricarboxylic acid, 1,1,2-ethanetricarboxylic acid, and nitrilotriacetic acid are preferred.

The monofunctional compounds F are selected from monocarboxylic acids, monoalcohols, and monoepoxides, having in each case from 1 to 20 carbon atoms. Preference is given among the monocarboxylic acids to acetic acid, 2-ethylhexanoic acid, isononanoic acid, and benzoic acid, among the monoalcohols to those having 2 to 20 carbon atoms such as ethanol, n-, iso-, sec-, and tert-butanol, amyl alcohol, 2-ethylhexanol, isononyl alcohol, and isotridecyl alcohol, and, among the monoepoxides, particularly to the glycidyl ethers or glycidyl esters of monohydric aliphatic alcohols and acids, such as butyl glycidyl ether and n-hexyl glycidyl ether, glycidyl acetate, glycidyl 2-ethylhexanoate, and the glycidyl esters of α-branched aliphatic monocarboxylic acids, such as α-methylalkanoic acids, and α,α-dimethylalkanoic acids, e.g., glycidyl neopentanoate and glycidyl neodecanoate.

Instead of the acids and hydroxy compounds it is also possible to use ester-forming derivatives of these compounds, namely esters of the acids with lower alcohols having from 1 to 6 carbon atoms, which may be linear or branched, such as, for example, methyl esters of the acids, and also anhydrides and acid halides, and esters of the hydroxy compounds with volatile acids, such as acetates or propionates of the hydroxy compounds, for example.

In a further preferred embodiment of the invention it is also possible to carry out at least partial esterification of the low molar mass, hydroxyl group-containing polyesters with phosphoric acid, phosphorous acid or organic phosphonic acids or their partial esters.

The low molar mass, hydroxyl group-containing polyesters are prepared in conventional manner by mixing the starting materials and condensing them together at elevated temperature. The condensation reaction may be accelerated conventionally by removing the water (or other condensates in the case where derivatives of the acids and alcohols used are employed) formed during the reaction by distillation under reduced pressure. The polycondensation may also be conducted in solvents which form an azeotrope with water; by distillation, removal of the water, and recycling of the solvent, the polycondensation may be performed with particular efficiency. The polycondensation may also be conducted in the presence of catalysts.

For the present invention preference is given to bulk polycondensation, i.e., polycondensation without the addition or presence of solvents. It is further preferred to prevent discoloration of the resulting polyester by adding reducing agents during the condensation. For this purpose it is possible, for example, to use phosphites or compounds of hypophosphorous acid; hydrogen peroxide can also be added.

Following polycondensation, the low molar mass polyesters may be diluted to the extent wanted using freely selectable solvents or solvent mixtures.

The addition polymers, which are likewise a constituent of the hydroxyl group-containing polymers, are derived from olefinically unsaturated alkyl esters G, the mass fraction of the structural units in the addition polymer that are derived from G being preferably from 20 to 60%. It is preferred here to use alkyl (meth)acrylates or dialkyl esters of the unsaturated dicarboxylic acids maleic acid and fumaric acid, examples being methyl (meth)acrylate, ethyl (meth)acrylate, n- and iso-propyl (meth)acrylate, n-, iso- and tert-butyl (meth)acrylate, isobornyl and isofenchyl (meth) acrylate, and dimethyl maleate.

They additionally contain units derived from olefinically unsaturated hydroxyalkyl esters H of one of the acids specified above under G, in a mass fraction of preferably from 10 to 40%. Preference is given to hydroxyethyl (meth) acrylate, 2-hydroxypropyl (meth)acrylate, 3-hydroxypropyl (meth)acrylate and 1-methyl-2-hydroxyethyl (meth) acrylate, and also 4-hydroxybutyl (meth)acrylate.

Also present are units derived from olefinically unsaturated monomers I, in a mass fraction of preferably from 20 to 60%. Preference here is given to styrene, α-methylstyrene, vinyltoluene, acrylonitrile, methacrylonitrile, acrylamide, and methacrylamide.

Also present are units derived from the carboxylic acids J, in a mass fraction of preferably up to 20%, in particular from 1 to 15%. The preferred carboxylic acids are acrylic and methacrylic acid.

The polymerization of these monomers takes place in the presence of the low molar mass, hydroxyl group-containing polyester. In the course of this reaction, graft addition polymers may be formed, with at least one of the polyester molecules becoming chemically attached to a free radical as a result of the abstraction of a hydrogen atom; moreover, simple (physical) mixtures are formed as well. These mixtures of graft polymers and of the polyesters and addition polymers which are present alongside one another are referred to below as "seed" polymers.

The addition polymerization is preferably performed without solvent (at the end of polymerization, as bulk addition polymerization). A bulk addition polymerization is an addition polymerization reaction which is generally conducted without solvent. In some cases, however, the presence of a small solvent fraction is also possible, specifically in a mass fraction of up to 20%, preferably up to 10%, and in particular up to 5%, based on the sum of the masses of the starting components. Nevertheless, working without solvent is preferred.

Suitable initiators of addition polymerization are the customary compounds which form free radicals, individually or in a mixture, such as peroxides, hydroperoxides, peracids, perketals, peresters, and azo compounds. These are, for example, aliphatic azo compounds, diacyl peroxides, peroxydicarbonates, alkyl peresters, alkyl hydroperoxides, perketals, dialkyl peroxides or ketone peroxides. Preference is given to dialkyl peroxides, such as di-t-butyl peroxide or di-t-amyl peroxide, and alkyl peresters, such as t-butyl peroxy-2-ethylhexanoate or t-amyl peroxy-2-ethylhexanoate. The amount of the initiators is chosen so that the ratio of their mass to the mass of the olefinically unsaturated monomers is from 0.5 to 5%, preferably up to 4%, in particular up to 3.5%.

The addition polymerization may be conducted batchwise or continuously, in one stage or in a plurality of stages, it being possible for the reactions to be performed in different reaction vessels or in the same reaction vessel in succession. It is also possible in the case of a multistage procedure to conduct the reaction continuously in one stage and batchwise in another stage.

The hydroxyl group-containing polymers of the invention—alone and in mixtures—are especially suitable for coatings applications in one- and two-component systems, in particular for high-solids systems, i.e., for solventborne mixtures having a high mass fraction of solids.

Suitable solvents for the hydroxyl group-containing polymers of the invention and the mixtures comprising these are, for example, aliphatic, cycloaliphatic, and aromatic hydrocarbons, such as alkylbenzenes, e.g., xylene, toluene; esters, such as ethyl acetate, butyl acetate, acetates with longer alcohol residues, butyl propionate, pentyl propionate, ethylene glycol monoethyl ether acetate, the corresponding methyl ether acetate, and propylene glycol methyl ether acetate; ethers, such as ethylene glycol monoethyl, monomethyl or monobutyl ether; glycols; alcohols; ketones such as methyl isoamyl ketone and methyl isobutyl ketone; lactones, and mixtures of such solvents. As solvents it is also possible to use reaction products of lactones with glycols or alcohols.

The present invention additionally provides coating compositions which comprise the hydroxyl group-containing polymers of the invention, where appropriate as a blend with other organic polyhydroxy compounds or with reactive diluents (low molar mass compounds which, alone or else together with the low molar mass, hydroxyl group-containing polymers such as acrylic copolymers and polyesters or other co-components, react with the curing agents that are used). Particularly suitable as co-component are acrylic copolymers formed, for example, from the monomers described above. These high-solids coating compositions are employed in particular in the coating of metals (especially in the context of general industrial applications, such as steel bridges, utility poles, freight containers, ships, wind power plants, and in the OEM finishing and refinishing of automobiles), in the coating of plastics and wood, and in the field of the coating of textiles, leather, paper, and building materials.

Suitable curing agents in these coating compositions include amino resins, polyisocyanates, and compounds containing anhydride groups, individually or in combination. The curing agent is added in each case in an amount such that the ratio of the number of OH groups of the hydroxyl group-containing polymer (or of the mixtures comprising it) to the number of reactive groups of the curing agent lies between 0.3:1 and 3:1.

Suitable amino resin curing agents are preferably urea resins, melamine resins and/or benzoguanamine resins. These are preferably etherified urea-, melamine- and/or benzoguanamine-formaldehyde condensation products. Suitable mixtures lie in the range from 50:50 to 90:10 for the ratios of the masses of the hydroxyl group-containing polymers and the curing agents, based in each case on the mass of the solid resin. Suitable phenolic resins and their derivatives can also be used as curing agents. In the presence of acids, e.g., p-toluenesulfonic acid, these curing agents lead to full curing of the coating. Heat curing can be performed conventionally at temperatures from 85 to 200° C. in, for example, from 10 to 30 minutes.

For the curing of the products of the invention with crosslinking, polyisocyanates are suitable, particularly at moderate temperatures or at room temperature. Suitable polyisocyanate components include in principle all aliphatic, cycloaliphatic or aromatic polyisocyanates which are known from polyurethane chemistry, individually or as mixtures. Examples of those highly suitable are low molar mass polyisocyanates such as hexamethylene diisocyanate, 2,2,4- and 2,4,4-trimethyl-1,6-hexamethylene diisocyanate, dodecamethylene diisocyanate, tetramethyl-p-xylylene diisocyanate, 1,4-diisocyanato-cyclohexane, 1-isocyanato-3,3,5-trimethyl-5-isocyanato-methylcyclohexane (IPDI), 2,4'- and 4,4'-diisocyanato-dicyclohexylmethane, 2,4'- and 4,4'-diisocyanato-diphenylmethane, and also mixtures of these isomers with their higher homologs, such as are obtainable in a manner known per se by phosgenating aniline/formaldehyde condensates, 2,4- and 2,6-diisocyanatotoluene, and any desired mixtures of such compounds.

It is preferred, however, to use derivatives of these simple polyisocyanates such as are customary in coating technology. These include polyisocyanates which contain, for example, biuret groups, uretdione groups, isocyanurate groups, urethane groups, carbodiimide groups or allophanate groups.

The particularly preferred modified polyisocyanates include N,N',N"-tris(6-isocyanatohexyl) biuret and its mixtures with its higher homologs, and also N,N',N"-tris(6-isocyanatohexyl) isocyanurate and its mixtures with its higher homologs containing more than one isocyanurate ring.

For curing at elevated temperature, blocked polyisocyanates, as well, and also polycarboxylic acids and their anhydrides, are suitable.

The hydroxyl group-containing polymers of the invention and the mixtures comprising them are especially suitable for producing high-solids, solventborne clearcoat and topcoat materials, and also for surfacers.

In coating compositions which are prepared with the hydroxyl group-containing polymers of the invention and/or the mixtures comprising them it is also possible for other auxiliaries and additives which are customary in coating technology but have not yet been mentioned to be present. These include, in particular, catalysts, leveling agents, silicone oils, additives such as cellulose esters, especially cellulose acetobutyrate, plasticizers, such as phosphates and phthalates, pigments such as iron oxides, lead oxides, lead silicates, titanium dioxide, barium sulfate, zinc sulfide, phthalocyanine complexes, etc., and fillers such as talc, mica, kaolin, chalk, quartz flour, asbestos flour, slate flour, various silicas, silicates, etc., viscosity modifiers, flatting agents, UV absorbers and light stabilizers, antioxidants and/or peroxide scavengers, defoamers and/or wetting agents, active diluents, reactive diluents, and the like.

The coating compositions may be applied to the respective substrate by known methods, by spreading, dipping, flow coating, pouring or with the aid of rollers or doctor blades, for example, in particular by spraying. They may be applied under hot conditions; where appropriate, they may be brought into a ready-to-apply form by the introduction of supercritical solvents (e.g., $CO_2$) under pressure. Industrial, automotive, plastics, wood, building-material, and textile coating materials having excellent properties may be obtained with binders or binder mixtures which are prepared using the hydroxyl group-containing polymers of the invention. These binders can be used not only for producing primers and intermediate coats but also for producing pigmented and unpigmented topcoats.

To produce such coats, the coating materials are generally cured at temperatures within the range from −20 to +100° C., preferably from −10 to +80° C.

In the examples which follow, as in the text which precedes them, all figures bearing the unit "%" are mass fractions (ratio of the mass of the substance in question to the mass of the mixture), unless specified otherwise. Concentrations given in "%" are mass fractions of the dissolved substance in the solution (mass of the dissolved substance divided by the mass of the solution).

EXAMPLES

1 Synthesis of the Polyesters

In accordance with the compositions in Table 1, polyesters were prepared by polycondensation of the starting materials. For this purpose the starting materials were heated at from 190 to 200° C. in a reaction vessel under nitrogen, with the water of reaction formed being removed continuously. The temperature was then raised gradually to 220° C. until the acid number had reached a level of between 20 and 30 mg/g. The polyesters were discharged and, after cooling, were ground.

TABLE 1

Mass fractions of the starting materials in the reaction mixture in % (cg/g)

|  | Polyester 1 | Polyester 2 | Polyester 3 |
|---|---|---|---|
| THEIC | 15.8 | 59.2 | 41.0 |
| NPG | 37.8 | — | — |
| EHA | — | 13 | — |
| E10 | — | — | 30.1 |
| HHPA | 46.4 | 27.8 | 28.9 |

Key:
THEIC trishydroxyethyl isocyanurate
NPG neopentyl glycol
EHA 2-ethylhexanoic acid
E10 glycidyl ester of α-branched alkanoic acids having on average 10 carbon atoms (® Versatic 10 Acid)
HHPA hexahydrophthalic anhydride On these polyesters the following properties were measured:

TABLE 2

Properties of the polyesters

|  | Polyester 1 | Polyester 2 | Polyester 3 |
|---|---|---|---|
| Tack (thumb test) at 23° C. | no | no | no |
| Acid number in mg/g | 23.5 | 24.3 | 20.8 |
| Hydroxyl number in mg/g | 205 | 196 | 193 |
| $M_w$ in g/mol | 1160 | 1380 | 1265 |
| $M_n$ in g/mol | 685 | 700 | 770 |
| $M_w/M_n$ | 1.7 | 2.0 | 1.6 |

The figures were determined in accordance with the methods described earlier on above.

Despite the fact that the molar masses of the polyesters are within the range of figures common for oligomers, the polyesters are solid at room temperature and exhibit no tackiness.

2 Synthesis of the Seed Polymers

Polymer 2a

In a reactor equipped with stirrer, heating, inert gas inlet, and feed device, 321 g of the polyester 1 from Example 1 were heated at 200° C. under nitrogen blanketing. Over the course of 6 hours, 128 g of n-butyl acrylate, 73.5 g of hydroxyethyl methacrylate and 119.5 g of styrene were metered in through a dropping funnel at a uniform rate. At the same time, over the course of 6 hours, 9.6 g of di-tert-butyl peroxide were added. After the 6 hours were up, the mixture was reinitiated with a further 1 g of di-tert-butyl peroxide dissolved in 3.2 g of butyl acetate, and was stirred for 2 more hours. After cooling, the polymer obtained was adjusted to a mass fraction of solids of approximately 80.0% (determined in accordance with DIN EN ISO 3251) by adding 133.5 g of butyl acetate.

The resulting polymer 2a was highly transparent and had the following parameters: acid number 9.3 mg/g, hydroxyl number 140 mg/g, dynamic viscosity (measured in accordance with DIN EN ISO 3219 at 23° C. in the form supplied, i.e., in the diluted form mentioned above) 5860 mPa·s, dynamic viscosity (measured in accordance with DIN EN ISO 3219 at 23° C. on a solution diluted to a mass fraction of solids of 50% with further butyl acetate) 23 mPa·s. The weight-average molar mass $M_w$ was 2605 g/mol and the polydispersity $M_w/M_n$ was 2.4 (gel permeation chromatography, polystyrene standards).

Polymer 2b and 2c

In a reactor equipped with stirrer, heating, inert gas inlet, and feed device, 320 g of the polyester 2 from Example 1 were heated at 200° C. under nitrogen blanketing. Over the course of 6 hours, 128 g of n-butyl acrylate, 82 g of hydroxypropyl methacrylate and 111 g of styrene were metered in through a dropping funnel at a uniform rate. At the same time, over the course of 6 hours, 9.6 g of di-tert-butyl peroxide were added. After the 6 hours were up, the mixture was reinitiated with a further 1 g of di-tert-butyl peroxide dissolved in 3.2 g of butyl acetate, and was stirred for 2 more hours. After cooling, the polymer obtained was adjusted to a mass fraction of solids of approximately 79.5% (determined in accordance with DIN EN ISO 3251) by adding about 130 g of butyl acetate.

The resulting polymer 2b was highly transparent and had the following parameters: acid number 9.5 mg/g, hydroxyl number 142 mg/g, dynamic viscosity (measured in accordance with DIN EN ISO 3219 at 23° C. in the form supplied, i.e., in the diluted form mentioned above) 9130 mPa·s, dynamic viscosity (measured in accordance with DIN EN ISO 3219 at 23° C. on a solution diluted to a mass fraction of solids of 50% with further butyl acetate) 31 mPa·s. The weight-average molar mass $M_w$ was 2910 g/mol and the polydispersity $M_w/M_n$ was 2.6 (gel permeation chromatography, polystyrene standards).

In the same way, the polymer 2c was prepared from the polyester 3 from Example 1 and the same monomers in the same amounts. The polymer 2c as well was highly transparent and had the following parameters: acid number 5.0 mg/g, hydroxyl number 141 mg/g, dynamic viscosity (measured in accordance with DIN EN ISO 3219 at 23° C. in the form supplied, i.e., in the diluted form mentioned above) 5100 mPa·s, dynamic viscosity (measured in accordance with DIN EN ISO 3219 at 23° C. on a solution diluted to a mass fraction of solids of 50% with further butyl acetate) 20 mPa·s. The weight-average molar mass $M_w$ was 2295 g/mol and the polydispersity $M_w/M_n$ was 2.3 (gel permeation chromatography, polystyrene standards).

3 Preparation of Ultrahigh-Solids Clearcoat Materials

Clearcoat materials with an efflux viscosity of 21 s (DIN 53211, 4 mm cup, 23° C.).

3.1 Coating Formulation

Using the compositions specified in Table 3 for the stated components, clearcoat materials were prepared and were then adjusted to a processing viscosity corresponding to an efflux time of 21 s (measured in accordance with DIN 53211 at 23° C.). (Unless indicated otherwise, all weighed amounts are in g.)

TABLE 3

| Binder | 1 (Polymer 2a) | Comparison (DE 100 33 512.8, Example 1) |
|---|---|---|
| Mass fraction of solids | 80.0% | 78.5% |
| Hydroxyl number | 140 mg/g | 165 mg/g |
| Binder | 88.5 g | 88.5 g |
| Solvent mixture 1 | 11.3 g | 11.3 g |
| ® Additol VAL 4930 | 0.2 g | 0.2 g |
| Total | 100.00 g | 100.00 g |
| ® Desmodur N 3300 | 33.9 g | 41.8 g |

TABLE 3-continued

| Binder | 1 (Polymer 2a) | Comparison (DE 100 33 512.8, Example 1) |
|---|---|---|
| Solvent mixture 2 | 34.1 g | 38.5 g |
| Clearcoat reference | 3.1 g | 3.2 g |

Solvent mixture 1: xylene/methoxypropyl acetate/butyl acetate (1/1/1 parts by mass)
Solvent mixture 2: butyl acetate/xylene/® Shellsol A (60/25/15 parts by mass)
® Shellsol A is the name for a solvent which contains C9 to C10 hydrocarbons, is rich in aromatics, and has a boiling range starting at 167° C.
® Additol VAL 4930: leveling agent (modified silicone, Solutia Germany GmbH & Co. KG, Mainz-Kastel)
® Desmodur N 3300: aliphatic polyisocyanate based on hexamethylene diisocyanate (Bayer AG, Leverkusen)

3.2 Coatings Testing of the Ultrahigh-Solids Clearcoat Materials 3.2.1 Drawdown Onto Glass Plates The clearcoat materials prepared as per 3.1 were applied to cleaned glass plates using a 200 μm doctor blade and were dried at room temperature (23° C., relative humidity 65%). The properties obtained are indicated in Table 4.

TABLE 4

Testing of the clearcoats

| Clearcoat reference | 3.1 | 3.2 (comparison) |
|---|---|---|
| Appearance of the coating films | transparent | transparent |
| Potlife in h | 6 | 6 |
| Tack-free time in h | 4 | 3.5 |
| Mass fraction of solids in % | 66 | 65 |

Potlife: time in hours until the coating material is twice its original viscosity
Tack-free time: time in hours until the coating material is not tacky (152 μm wet film, thumb testing)
Mass fraction of solids: experimentally determined (in accordance with DIN EN ISO 3251) mass fraction of solids (fraction of nonvolatile compounds) in the ready-to-apply coating material.

The mass fractions of solids achieved were all in the region around 65%. All of the products underwent rapid initial drying and gave a comparably long processing time, which was within the range required for industrial paint application (more than 3 hours). In accordance with the accuracy of the measurement method, the tack-free time is the same.

3.2.2 Spray Application

The clearcoat materials described under 3.1 were sprayed using a commercial cup-type gun onto degreased and cleaned steel panels (30×20 cm). By applying different numbers of films from the top to the bottom edge of the panels, a film-thickness profile graduated in a steplike manner was produced on each panel. On forced drying of the coated panels in vertical position in a forced-air oven at 80° C. for 30 minutes, this profile was retained. Subsequently, the minimum and maximum dry film thicknesses on each panel were measured (see Table 5), as were the beginning of formation of a coherent film (leveling) and the first appearance of blisters in the coating ("popping limit").

TABLE 5

Test results on spray application

| Clearcoat reference | 3.1 | 3.2 (comparison) |
|---|---|---|
| Dry film thickness, top edge in μm | 10 | 12 |
| Dry film thickness, bottom edge in μm | 120 | 120 |
| Leveling in μm | 16 | 16 |
| Blistering in μm | none | >70 |

Even at the maximum dry film thickness of approximately 120 μm, the clearcoat material produced with the binder of the invention still had no popping blisters, even when forced drying (30 minutes at 80° C.) was employed. In the case of the comparison clearcoat, on the other hand, popping blisters were found from just 70 μm, owing to inadequate devolatilization properties of the comparison binder.

The leveling of all the clearcoats was classed as equivalent.

3.3 UV Yellowing

Wet films 300 μm thick were drawn down onto white tiles and dried at room temperature (23° C., 65% relative humidity) for 7 days.

The tiles with the clearcoat material based on the binder of the invention and, respectively, on the comparison binder were passed 10 times through a UV coating unit (speed 4 m/min, lamp output 2×80 W/cm). The degree of yellowing was assessed visually thereafter.

In the case of the clearcoat containing the binder of the invention, as in the case of the comparison material, no yellowing was found. A commercial product (polyester-modified acrylate, the polyester containing aromatic constituents), as a comparative material, exhibited severe yellowing in this test.

3.4 Development of Hardness and Solvent Resistance

The clearcoat materials prepared as in 3.1 were drawn down onto cleaned glass plates using a 200 μm doctor blade. After a flash-off time of 10 minutes (23° C., 65% relative humidity), the test plates were subjected to forced drying in a forced-air oven at 80° C. for 30 minutes. Following forced drying, the test plates were stored for 1 hour and, respectively, 24 hours at 23° C. and a relative humidity of 65%.

After 1 and 24 hours, respectively, the pendulum hardnesses were measured (in accordance with DIN 53157). After 24 hours, the resistance to premium-grade gasoline and xylene was determined by placing cotton pads soaked with xylene or premium-grade gasoline, respectively, onto the coating film and performing scratch tests (fingernail test) at minute intervals. The time during which the coating film had not yet softened was reported as the measure of resistance.

TABLE 6

Results of coatings testing

| Clearcoat reference | 3.1 | 3.2 (comparison) |
|---|---|---|
| Dry film thickness (ISO 2808) in μm | 52 | 50 |
| König pendulum hardness (DIN 53157) | | |
| after 1 hour in s | 142 | 140 |
| after 24 hours in s | 160 | 162 |

TABLE 6-continued

Results of coatings testing

| Clearcoat reference | 3.1 | 3.2 (comparison) |
|---|---|---|
| Premium-grade gasoline resistance in min | >10 | >10 |
| Xylene resistance in min | >10 | >10 |

Despite its extremely low molar mass nature, the clearcoat based on the binder of the invention showed outstandingly high pendulum hardnesses and solvent resistance, just like the comparison material.

4 Preparation of White Paints for Air Mix and Airless Application 4.1 Paint Formulation Using the compositions indicated in Table 7 for the stated components, white paints were prepared and were subsequently adjusted with solvent mixture 2 to a processing viscosity corresponding to an efflux time of 60 s (measured in accordance with DIN 53211, 23° C.) for the air mix application and of 90 s for the airless application. The precise formulas are set out in Table 7 (masses in g).

TABLE 7

White paints

| Binder | 1 (polymer 2a) | Comparison (DE 100 33 512.8, Example 1) |
|---|---|---|
| Mass fraction of solids | 80% | 78.5% |
| Hydroxyl number | 140 mg/g | 165 mg/g |
| Component A: | | |
| Binder | 48.6 g | 48.6 g |
| Solvent mixture 1 | 6.0 g | 6.0 g |
| ® Additol XL 270 (wetting agent) | 1.3 g | 1.3 g |
| Butyl diglycol acetate | 3.0 g | 3.0 g |
| ® Kronos 2310 | 35.1 g | 35.1 g |
| ® Thixatrol ST | 1.3 g | 1.3 g |
| ® Additol VXL 4930 (leveling agent) | 0.3 g | 0.3 g |
| Solvent mixture 2 | 4.0 g | 4.0 g |
| ® Perenol E1 (defoamer) | 0.4 g | 0.4 g |
| Total | 100.0 g | 100.0 g |
| Curative: | | |
| ® Desmodur N 3300 | 18.3 g | 23.0 g |
| Solvent mixture 2 | 12.1 g | 15.2 g |
| Paint reference | 4.1 g | 4.2 g |
| Paint solids at 60 s | 75% | 74% |
| Paint solids at 90 s | 81% | 80% |
| Mass ratio of volatile fractions and solids (60 s) | 25/75 = 33% | 26/74 = 35% |

TABLE 7-continued

White paints

| Binder | 1 (polymer 2a) | Comparison (DE 100 33 512.8, Example 1) |
|---|---|---|
| Mass ratio of volatile fractions and solids (90 s) | 19/81 = 23% | 20/80 = 25% |

Solvent mixture 1: butyl acetate/® Shellsol A/xylene (60/15/25 parts by mass)
Solvent mixture 2: ® Shellsol E/® Shellsol A/butyl glycol acetate (60/15/25 parts by mass)
® Additol XL 270: electroneutral wetting agent and dispersant (Solutia Germany GmbH & Co. KG, Mainz-Kastel)
® Kronos 2310: titanium dioxide pigment of group R2 (Kronos Titan GmbH, Leverkusen)
® Thixatrol ST: thixotropic agent based on castor oil (Kronos Titan GmbH, Leverkusen)
® Additol VXL 4930: leveling agent (Solutia Germany GmbH & Co. KG, Mainz-Kastel)
® Perenol E1: silicone-free defoamer (Cognis GmbH, Düsseldorf)
® Desmodur N 3300: polyisocyanate (Bayer AG, Leverkusen)

4.2 Coatings Testing
  4.2.1 Application with 300 μm Doctor Blade
  The white paints prepared as per 4.1 and adjusted to an efflux time of 60 s (DIN 53211, 23° C.) were drawn down onto cleaned glass plates using a 300 μm doctor blade and dried at room temperature (23° C., 65% relative humidity) for 7 days. The surfaces of the paint films were examined visually for film defects.
  The dry film thickness was in each case 125 μm. The paint based on the binder of the invention, at this thickness, exhibited no popping blisters or other surfaces defects indicating poor devolatilization properties. The glass plates coated with the comparison paint, on the other hand, showed numerous popping blisters and pinholes.
  4.2.2 Air Mix Spraying
  The white paints prepared as per 4.1 were applied to degreased and cleaned steel panels (20×30 cm) using an air mix spray gun. Application was as described under 3.2.2, to give a steplike film thickness profile.
  The coated metal panels were dried standing vertically at 23° C. and 65% relative humidity for 7 days.

TABLE 8

Results of paint testing

| Paint reference | 4.1 | 4.2 (comparison) |
|---|---|---|
| Dry film thickness; top edge in μm | 30 | 32 |
| Dry film thickness; bottom edge in μm | 200 | 185 |
| Blistering from film thicknesses of μm | not observed | 40 |

The white paint based on the binder of the invention can be sprayed using air mix technology and, even at dry film thicknesses of approximately 200 μm with the relatively high processing viscosity (efflux time of 60 s in accordance with DIN 53211, 4 mm cup, 23° C.), displayed no surface defects such as popping blisters or pinholes. In contrast, the comparison paint showed numerous popping blisters and pinholes from as low as about 40 μm.
  4.2.3 Airless Spraying
  The white paints prepared as per 4.1 and adjusted with solvent mixture 2 to an efflux time of 90 s (DIN 53211, 4 mm cup, 23° C.) were applied to degreased and cleaned steel panels (20×30 cm) using an airless spray gun. Application was as described under 3.2.2, to give a steplike film thickness profile.

The coated metal panels were dried standing vertically at 23° C. and 65% relative humidity for 7 days.

TABLE 9

Results of paint testing

| Paint reference | 4.1 | 4.2 (comparison) |
|---|---|---|
| Dry film thickness; top edge in μm | 45 | 50 |
| Dry film thickness; bottom edge in μm | 320 | 280 |
| Blistering from film thicknesses of μm | 260 | 50 |

The white paint based on the binder of the invention can be sprayed using the airless technology and exhibited surface defects such as popping blisters or pinholes only at high dry film thicknesses of more than about 250 μm with the processing viscosity of 90 seconds (measured as the efflux time in accordance with DIN 53211, 4 mm cup, 23° C.). In contrast, the comparison paint did not undergo devolatilization at all under the conditions of airless application and therefore, even as a thin film, had numerous popping blisters and pinholes over the entire panel.

What is claimed is:

1. A hydroxyl group-containing polymer which comprises fractions of polyesters and fractions of addition polymers formed from olefinically unsaturated monomers, the polyesters containing a unit derived from trishydroxyethl isocyanurate or trishydroxypropyl isocyanurate or units of diepoxy or polyepoxy compounds A, aliphatic cyclic dicarboxylic or polycarboxylic acids B, and, where appropriate, further units derived from branched aliphatic acyclic dihydroxy or polyhydroxy compounds C, from aliphatic linear acyclic dihydroxy or polyhydroxy compounds D which contain at least two hydroxyl groups per molecule, from polyfunctional compounds E, the compounds E being selected from aliphatic linear and branched dicarboxylic acids E1 and from aromatic dicarboxylic and polycarboxylic acids E2 containing at least two carboxyl groups per molecule, and from monofunctional compounds F, the compounds F being selected from monocarboxylic acids, monoalcohols, and monoepoxides, wherein the polyesters contain one unit each from groups A and B and also not more than one further unit from one of groups C, D, E, and the addition polymers containing units of olefinically unsaturated alkyl esters G of aliphatic, linear, branched or cyclic olefinically unsaturated monocarboxylic and/or dicarboxylic acids, olefinically unsaturated hydroxyalkyl esters H of one of the acids specified under G, at least one further olefinically unsaturated monomer I selected from vinylaromatics, vinyl esters, halogenated monomers, unsaturated nitriles, amides or diamides of unsaturated monocarboxylic acids, vinyl ethers, and allyl ethers, and also, where appropriate, carboxylic acids J, selected from the monocarboxylic acids specified under G or dicarboxylic acids specified under G in unesterified or monoesterified form.

2. The hydroxyl group-containing polymer as claimed in claim 1 whose hydroxyl number is from 40 to 250 mg/g.

3. The hydroxyl group-containing polymer as claimed in claim 1 whose acid number is from 0 to 30 mg/g.

4. The hydroxyl group-containing polymer as claimed in claim 1 whose weight-average molar mass is not more than 3500 g/mol.

5. The hydroxyl group-containing polymer as claimed in claim 1, wherein the polyesters have a weight-average molar mass of up to 1750 g/mol.

6. The hydroxyl group-containing polymer as claimed in claim 1, wherein the polyesters contain not more than three aliphatic units from groups A, B and C such that only one compound from each of the groups is present in the polyester.

7. The hydroxyl group-containing polymer as claimed in claim 1, comprising a mixture of two or more polyesters of different composition.

8. The hydroxyl group-containing polymer as claimed in claim 1, wherein the polyesters further contain a structural unit from a fourth group, the sum of the masses of the structural units from groups A, B and one of groups C, D, E, and F making up at least 90% of the mass of the polyester.

9. The hydroxyl group-containing polymer as claimed in claim 1, wherein the polyester contains units derived from 1,2- or 1,4-cyclohexanedicarboxylic acid.

10. The hydroxyl group-containing polymer as claimed in claim 1, wherein the polyester contains units derived from neopentyl glycol, 2,2,4-trimethylpentanediol, 2,2,4-trimethylhexanediol, 2,4,4-trimethylhexanediol, trimethylolethane, trimethylolpropane and/or pentaerythritol.

11. The hydroxyl group-containing polymer as claimed in claim 1, wherein the polyester contains units derived from the glycidyl esters of α-branched aliphatic monocarboxylic acids.

12. The hydroxyl group-containing polymer as claimed in claim 1, comprising mass fractions of from 30 to 70% of the polyester and from 70 to 30% of the addition polymer.

13. The hydroxyl group-containing polymer as claimed in claim 1, wherein the addition polymers contain units derived from methyl (meth)acrylate, ethyl (meth)acrylate, n-butyl (meth)acrylate, tert-butyl (meth)acrylate, isobornyl (meth) acrylate and/or isofenchyl (meth)acrylate.

14. The hydroxyl group-containing polymer as claimed in claim 1, wherein the addition polymers contain units derived from hydroxyethyl (meth)acrylate, the isomeric hydroxypropyl (meth)acrylates and/or hydroxybutyl (meth) acrylate.

15. The hydroxyl group-containing polymer as claimed in claim 1, wherein the addition polymers contain units derived from styrene and/or vinyltoluene.

16. The hydroxyl group-containing polymer as claimed in claim 1, wherein the addition polymers contain units derived from acrylic and/or methacrylic acid.

17. The hydroxyl group-containing polymer as claimed in claim 1, wherein the polyesters further contain units from one of the groups of the aliphatic linear acyclic dihydroxy or polyhydroxy compounds D which contain at least two hydroxyl groups per molecule, the polyfunctional compounds E, the compounds E being selected from aliphatic linear and branched dicarboxylic acids E1 and aromatic dicarboxylic and polycarboxylic acids E2 containing at least two carboxyl groups per molecule, and the monofunctional compounds F, the compounds F being selected from monocarboxylic acids, monoalcohols, and monoepoxides.

18. A process for preparing a hydroxyl group-containing polymer as claimed in claim 1, which comprises forming, in the presence of a polyester containing units from aliphatic cyclic or polycyclic dihydroxy or polyhydroxy or diepoxy or polyepoxy compounds A, aliphatic cyclic dicarboxylic or polycarboxylic acids B, and branched aliphatic acyclic dihydroxy or polyhydroxy compounds C, addition polymers by free-radically initiated copolymerization of olefinically unsaturated alkyl esters G of aliphatic, linear, branched or cyclic olefinically unsaturated monocarboxylic and/or dicarboxylic acids, olefinically unsaturated hydroxyalkyl esters H of one of the acids specified under G, at least one further olefinically unsaturated monomer I selected from vinylaromatics, vinyl esters, halogenated monomers, unsaturated nitriles, amides or diamides of unsaturated monocarboxylic acids, vinyl ethers, and allyl ethers, and also, where appropriate, carboxylic acids J, selected from the monocarboxylic acids specified under G or dicarboxylic acids specified under G in unesterified or monoesterified form.

19. The process as claimed in claim 18, wherein the polyester, in addition to or instead of the components C, contains units derived from one of the groups of the aliphatic linear acyclic dihydroxy or polyhydroxy compounds D which contain at least two hydroxyl groups per molecule, the polyfunctional compounds E, the compounds E being selected from aliphatic linear and branched dicarboxylic acids E1 and aromatic dicarboxylic and polycarboxylic acids E2 containing at least two carboxyl groups per molecule, and the monofunctional compounds F, the compounds F being selected from monocarboxylic acids, monoalcohols, and monoepoxides.

20. A coating composition comprising a hydroxyl group-containing polymer as claimed in claim 1.

21. The coating composition as claimed in claim 20, further comprising other reactive hydroxyl group-containing binders selected from the group consisting of acrylic copolymers and polyesters or diluents.

22. The coating composition as claimed in claim 20, comprising as curing agents amino resins, polyisocyanates or compounds containing anhydride groups.

* * * * *

UNITED STATES PATENT AND TRADEMARK OFFICE
CERTIFICATE OF CORRECTION

PATENT NO.    : 6,849,693 B2
DATED         : February 1, 2005
INVENTOR(S)   : Ulrich Epple et al.

It is certified that error appears in the above-identified patent and that said Letters Patent is hereby corrected as shown below:

Column 15,
Lines 44-45, "groups C, D, E, and the addition polymers" should read
-- groups C, D, E, and F, and the addition polymers --.

Signed and Sealed this

Seventh Day of June, 2005

JON W. DUDAS
*Director of the United States Patent and Trademark Office*